(12) United States Patent
Yang et al.

(10) Patent No.: US 7,852,453 B2
(45) Date of Patent: Dec. 14, 2010

(54) IPS MODE LIQUID CRYSTAL DISPLAY DEVICE AND METHOD FOR FABRICATING THEREOF

(75) Inventors: Joon-Young Yang, Gyeonggi-do (KR); Jung-Il Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/561,981

(22) Filed: Sep. 17, 2009

(65) Prior Publication Data

US 2010/0009478 A1    Jan. 14, 2010

Related U.S. Application Data

(62) Division of application No. 11/320,770, filed on Dec. 30, 2005, now Pat. No. 7,609,349.

(30) Foreign Application Priority Data

May 20, 2005    (KR) ............................ 2005-42702

(51) Int. Cl.
G02F 1/13 (2006.01)
H01L 21/77 (2006.01)

(52) U.S. Cl. .................. 349/187; 438/30; 257/E21.536

(58) Field of Classification Search .............. 349/141, 349/41, 42, 43, 46, 47, 56, 73, 74, 81, 82, 349/84, 138, 143, 144, 147, 187, 191, 38, 349/39; 438/30, 38; 257/E21.536

See application file for complete search history.

(56) References Cited

U.S. PATENT DOCUMENTS

| | | | |
|---|---|---|---|
| 6,630,977 B1 | 10/2003 | Yamazaki et al. | |
| 6,950,168 B2 | 9/2005 | Yamazaki et al. | |
| 7,126,661 B2 | 10/2006 | Yamazaki et al. | |
| 7,609,349 B2 * | 10/2009 | Yang et al. | 349/141 |
| 2004/0051100 A1 | 3/2004 | Yamazaki et al. | |
| 2006/0007380 A1 | 1/2006 | Yamazaki et al. | |
| 2006/0262263 A1 | 11/2006 | Yang et al. | |
| 2010/0009478 A1 * | 1/2010 | Yang et al. | 438/30 |

* cited by examiner

*Primary Examiner*—Brian M Healy
(74) *Attorney, Agent, or Firm*—Birch, Stewart, Kolasch & Birch, LLP (57) ABSTRACT

An IPS mode LCD device and a method for fabricating the same are disclosed. A switching device is formed at each unit pixel and then a passivation layer is formed thereon. A first concave pattern and a second concave pattern at each unit pixel by using one mask are formed, and a common electrode is formed in the first concave pattern and a pixel electrode is formed in the second concave pattern. Accordingly, the entire fabrication process is simplified.

14 Claims, 8 Drawing Sheets

IPS MODE LIQUID CRYSTAL DISPLAY DEVICE AND METHOD FOR FABRICATING THEREOF

CROSS REFERENCE TO A RELATED APPLICATION

This application is a divisional of co-pending U.S. application Ser. No. 11/320,770, filed Dec. 30, 2005,now U.S. Pat. No.7,609,349 which is claims priority to Korean Application Number 42702/2005 filed on May 20, 2005, the entire contents of each of these applications are incorporated by reference herein.

BACKGROUND OF THE INVENTION

1. Field of the Invention

The present invention relates to an in-plane switching (IPS) mode liquid crystal display (LCD) device and to a method for fabricating an IPS mode LCD device that minimizes a number of masks used in the fabrication process.

2. Description of the Related Art

A liquid crystal display (LCD) device serves to display an image by controlling an arrangement of liquid crystal molecules having a dielectric anisotropy and a refractive anisotropy by using an electric field. A polarized light is prevented from being transmitted or allowed to be transmitted by the liquid crystal molecules according to an arrangement direction of the liquid crystal molecules. Therefore, if the arrangement direction of the liquid crystal molecules is controlled, the display can be controlled. Since the arrangement direction of the liquid crystal molecules is controlled by the applied electric field, the LCD device is provided with electrodes for applying the electric field to the liquid crystal molecules.

The LCD device comprises an array substrate in which pixel electrodes for applying an electric field to liquid crystal molecules are arranged in a matrix form, a color filter substrate facing the array substrate for displaying colors, and a liquid crystal layer formed between the array substrate and the color filter substrate.

Generally, the LCD device is implemented in a twisted nematic (TN) mode in which the liquid crystal molecules are twisted as a spiral shape which has the advantages of a fast operation speed and a low driving voltage driving requirements. The TN mode LCD device includes an array substrate, a color filter substrate facing the array substrate, and a liquid crystal layer formed between the array substrate and the color filter substrate. In the array substrate, pixel electrodes are provided for applying the electric field to the liquid crystal molecules are arranged in a matrix form.

The TN mode LCD device has a disadvantage that a viewing angle is narrow. This is due to a dielectric characteristic of liquid crystal in which vertical electric field is applied to the liquid crystal molecules. As a result, brightness and picture quality of the screen display significantly varies according to a user's viewing direction.

Accordingly, an IPS mode LCD device capable of improving a viewing angle has been introduced. In the IPS mode LCD device, the electric field is applied in a horizontal direction to the array substrate. That is, liquid crystal is driven in a direction parallel to the plane of the array substrate by the electric field.

In order to horizontally drive the liquid crystal on the substrate, the IPS mode LCD device is provided with pixel electrodes for applying the electric field to the liquid crystal molecules and common electrodes on the same substrate.

Hereinafter, a structure of a unit pixel of a related art IPS mode LCD device will be explained with reference to FIG. 1.

The unit pixel is an area defined by a plurality of gate lines 101 and a plurality of data lines 102 crossing the gate lines 101. The unit pixel is provided with at least one common electrode 105 branching from a common electrode line 104. The common electrode 105 branches in a direction parallel with the gate lines 101. Also, the unit pixel is provided with at least one pixel electrode 106 that extends in a direction parallel with the common electrode 105. The common electrode 105 and the pixel electrode 106 are formed on the same substrate to enable the horizontal electric field to be applied to the liquid crystal.

The unit pixel is provided with a switching device, a thin film transistor 103 for controlling the unit pixel at a corner thereof. The thin film transistor 103 is formed at each intersection between the gate lines 101 and the data lines 102, and is respectively connected to the gate lines 101 to which scan signals are applied and to the data lines 102 to which pixel signals are applied. Also, the thin film transistor 103 is connected to the pixel electrode 106 to deliver the pixel signal from the data line 102 to the pixel electrode 106 under the control of the scan signal from the gate line 101. The pixel electrode 106 in conjunction with the common electrode 105 applies the horizontal electric field to liquid crystal.

The pixel electrode 106 partially overlaps with the common electrode line 104 to form a storage capacitor.

Hereinafter, a structure of the unit pixel of the related art IPS mode LCD device will be explained with reference to FIG. 2.

Figure 1:
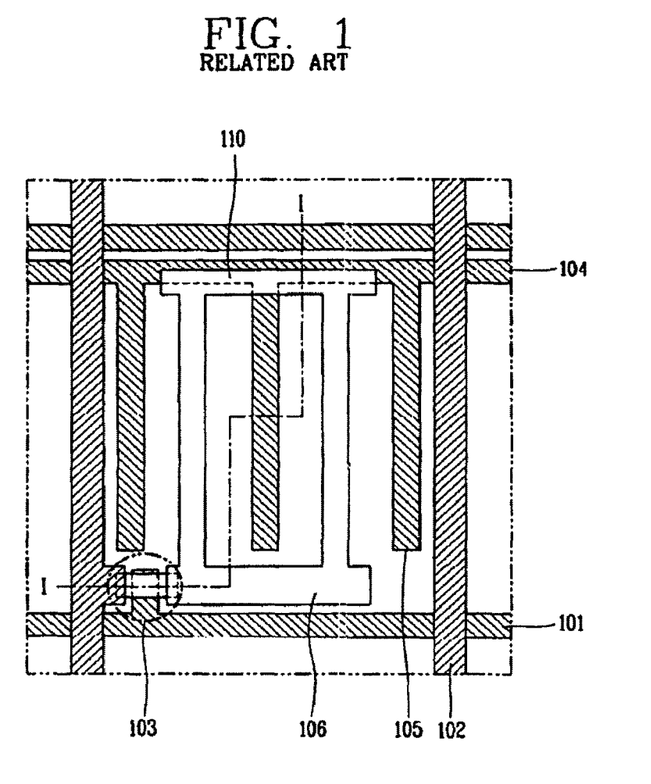
FIG. 1 is a plane view showing a unit pixel of an IPS mode LCD device in accordance with a related art.
Figure 2:
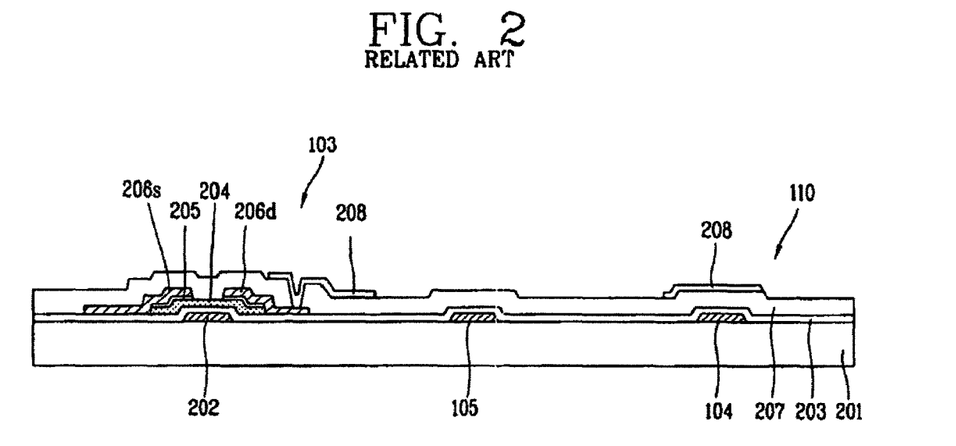
FIG. 2 is a sectional view showing the unit pixel of an IPS mode LCD device in accordance with the related art.

FIG. 2 is a sectional view taken along line I-I in FIG. 1. Referring to FIG. 2, the unit pixel is provided with a thin film transistor 103 at a corner thereof. The common electrode 105, the common electrode line 104, and a pixel electrode 208 (106 in FIG. 1) are formed in the unit pixel.

A gate electrode 202, the common electrode 105, and the common electrode line 104 are formed on a glass substrate 201. Since the gate electrode 202 branches from the gate line 101 and the common electrode 105 branches from the common electrode line 104, the gate line 101, the gate electrode 202, the common electrode line 104, and the common electrode 105 are formed on the same glass substrate 201. The gate electrode 202, the gate line 101 (not shown in FIG. 2), the common electrode 105, and the common electrode line 104 are covered by a gate insulating layer 203.

An active layer 204 is formed over the gate electrode 202 such that the gate insulating layer 203 is disposed therebetween. Also, a source electrode 206s and a drain electrode 206d are respectively formed over the active layer 204 and an ohmic contact layer 205 is disposed therebetween. The source electrode 206s and the drain electrode 206d are electrically separated from each other. Only the active layer 204 disposed between the source electrode 206s and the drain electrode 206d constitutes a channel. The gate electrode 202, the active layer 204, and the source/drain electrodes 206s and 206d constitute the thin film transistor 103.

A passivation layer 207 is formed on the source electrode 206S and the drain electrode 206D, thereby forming the lower thin film transistor.

A pixel electrode 208 (106 in FIG. 1) is formed on the passivation layer 207, and is connected to the drain electrode 206D through the passivation layer 207. The pixel electrode 208 is farther formed over the common electrode line 104 forming a storage capacitor together with the common electrode line 104. The pixel electrode 208 is formed to be parallel with the gate line 101 and also parallel with the common electrode 105 formed on the same layer.

Accordingly, the pixel electrode 208 connected to the thin film transistor 103 and the common electrode 105 branching from the common electrode line 104 are horizontally formed in the unit pixel, thereby applying the horizontal electric field to the liquid crystal layer (not shown).

Hereinafter, a method for fabricating the related art IPS mode LCD device will be explained with reference to FIGS. 3A to 3D, in which each component of the unit pixel will be explained.

Figure 3A:
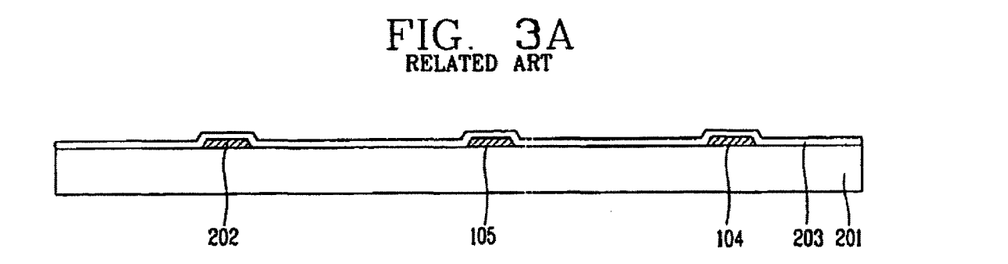
FIGS. 3A to 3D are flowcharts showing a method for fabricating a unit pixel of an IPS mode LCD device in accordance with the related art.

As shown in FIG. 3A, a metal thin film is deposited on the substrate 201, and then the gate electrode 202, the common electrode 105, and the common electrode line 104 are patterned by using a first mask in a photolithography process. Next, the gate insulating layer 203 for covering the gate electrode 202, the common electrode 105, and the common electrode line 104 is formed.

Figure 3B:
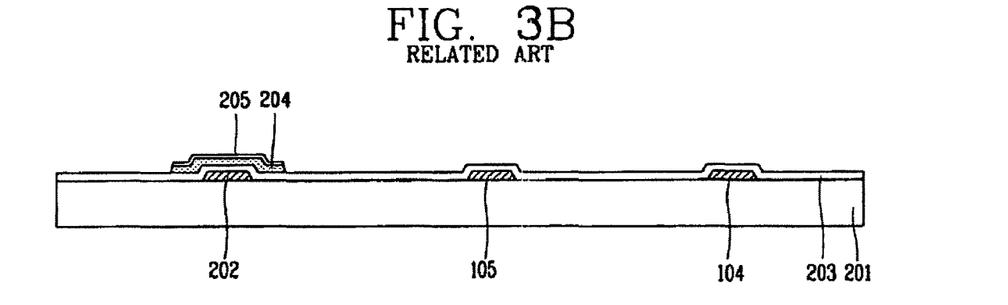

As shown in FIG. 3B, a semiconductor layer and an ohmic contact layer are sequentially formed on the gate insulating layer 203, and then the active layer 204 is patterned by using a second mask in the photolithography process. The ohmic contact layer 205 remains on the active layer 204.

Figure 3C:
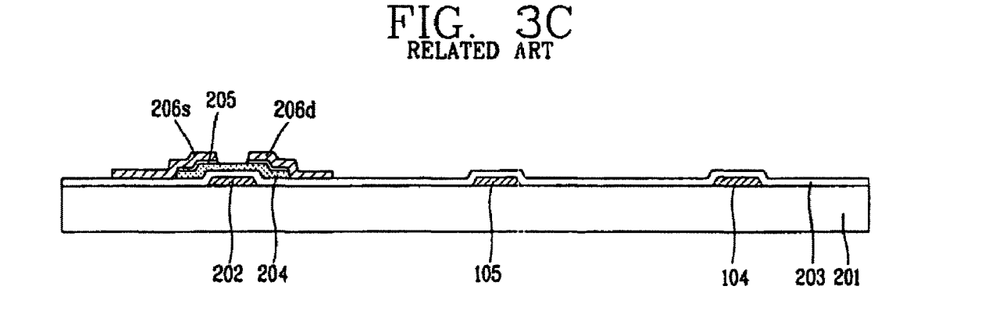

As shown in FIG. 3C, a conductive layer is deposited on the active layer 204, and then the source and drain electrodes 206s and 206d are formed by using a third mask.

Figure 3D:
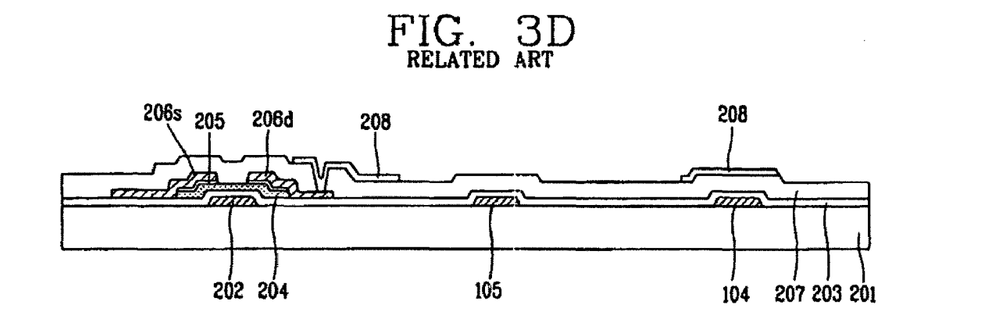

Next, as shown in FIG. 3D, the passivation layer 207 is formed on the source and drain electrodes 206s and 206d, and then the passivation layer 207 on the drain electrode 206d is removed by using a fourth mask to expose the drain electrode 206d.

Next, a transparent electrode material such as ITO is deposited on the passivation layer 207, and then the pixel electrode 208 is patterned by using a fifth mask. The pixel electrode 208 is patterned to partially overlap with the common electrode line 104 to form the storage capacitor.

The conventional method for fabricating an IPS mode LCD device has at least the following disadvantage. Since many expensive masks are used, the fabrication process is long and the fabrication cost is increased.

BRIEF DESCRIPTION OF THE INVENTION

Therefore, an object of the present invention is to provide a method for fabricating an in plane switching (IPS) mode liquid crystal display (LCD) device capable of reducing the number of masks to be used and using a thin film transistor as a switching device, and an LCD device using the same.

To achieve these and other advantages and in accordance with the purpose of the present invention, as embodied and broadly described herein, an IPS mode LCD device according to an embodiment of the present invention comprises a unit pixel defined by a plurality of gate lines and a plurality of data lines crossing the gate lines; a common electrode line formed at each unit pixel; a switching device formed at each intersection between the gate lines and the data lines and formed at each unit pixel; a passivation layer for covering the unit pixels; at least one first concave pattern formed by cutting the passivation layer on the unit pixel, for exposing the common electrode line; at least one second concave pattern formed by cutting the passivation layer on the unit pixel, for exposing a drain electrode of the switching device; a common electrode formed in the first concave pattern and a pixel electrode formed in the second concave pattern.

The pixel electrode and the common electrode are parallel with each other, and are insulated by a overcoat layer formed at the first concave pattern and the second concave pattern. Preferably, the overcoat layer is hardened.

Preferably, a storage line is further provided in the unit pixel.

Preferably, the drain electrode is formed to overlap with the storage line with an insulating layer is disposed therebetween, thereby forming a storage capacitor.

To achieve these and other advantages and in accordance with the purpose of the present invention, as embodied and broadly described herein, a method for fabricating an IPS mode LCD device according to an embodiment of the present invention comprises forming a gate line, a gate electrode, and a common electrode line on a substrate; forming a gate insulating layer on the gate line, the gate electrode, and the common electrode line on the substrate; sequentially forming a semiconductor layer, an ohmic contact layer, and a conductive layer on the gate insulating layer; etching the semiconductor layer, the ohmic contact layer and the conductive layer thereby forming an active layer and source/drain electrodes; forming a passivation layer on the source/drain electrodes; forming a photosensitive pattern on the passivation layer; applying the photosensitive pattern as a mask and etching the passivation layer and the gate insulating layer, thereby forming a first concave pattern for exposing the common electrode line and a second concave pattern for exposing the drain electrode; and forming a common electrode in the first concave pattern and forming a pixel electrode in the second concave pattern.

The step of forming a common electrode in the first concave pattern and a pixel electrode in the second concave pattern, comprises: forming a transparent electrode material on the photosensitive pattern, the first concave pattern, and the second concave pattern; forming a overcoat layer on the transparent electrode material; removing the overcoat layer so that the overcoat layer can remain only on the first concave pattern and the second concave pattern; removing the transparent electrode material exposed by removing the overcoat layer; and hardening the overcoat layer remaining in the first concave pattern and the second concave pattern.

The step of forming an active layer and source/drain electrodes by etching the semiconductor layer, the ohmic contact layer and the conductive layer, comprises: forming a photosensitive layer on the conductive layer; diffraction-exposing the photosensitive layer by using a diffraction mask; sequentially etching the conductive layer, the ohmic contact layer, and the semiconductor layer by using the diffraction-exposed photosensitive pattern; ashing the diffraction-exposed photosensitive pattern thereby exposing the conductive layer on a channel layer; removing the conductive layer and the ohmic contact layer by applying the ashed photosensitive pattern as a mask, and thereby exposing the channel layer.

In the step of removing the transparent electrode material exposed by removing the overcoat layer, the photosensitive pattern and the transparent electrode material formed thereon are simultaneously removed by a lift-off method.

The step of forming a common electrode in the first concave pattern and forming a pixel electrode in the second concave pattern, comprises: removing the photosensitive pattern thereby exposing the passivation layer; forming a transparent electrode material on the passivation layer, the first concave pattern, and the second concave pattern; forming a overcoat layer on the transparent electrode material; removing the overcoat layer so that the overcoat layer can remain only at the first concave pattern and the second concave pattern; removing the transparent electrode material exposed by removing the overcoat layer; and hardening the overcoat layer remaining at the first concave pattern and the second concave pattern.

In the step of hardening the overcoat layer, only the overcoat layer within a pixel region is hardened. Also, the step of hardening the overcoat layer further comprises exposing a pad portion by removing the overcoat layer outside the pixel region formed as the overcoat layer is hardened.

In the step of forming a gate line, a gate electrode, and a common electrode line on a substrate, a first storage line is further formed, and the drain electrode is overlapped with the storage line.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 4:
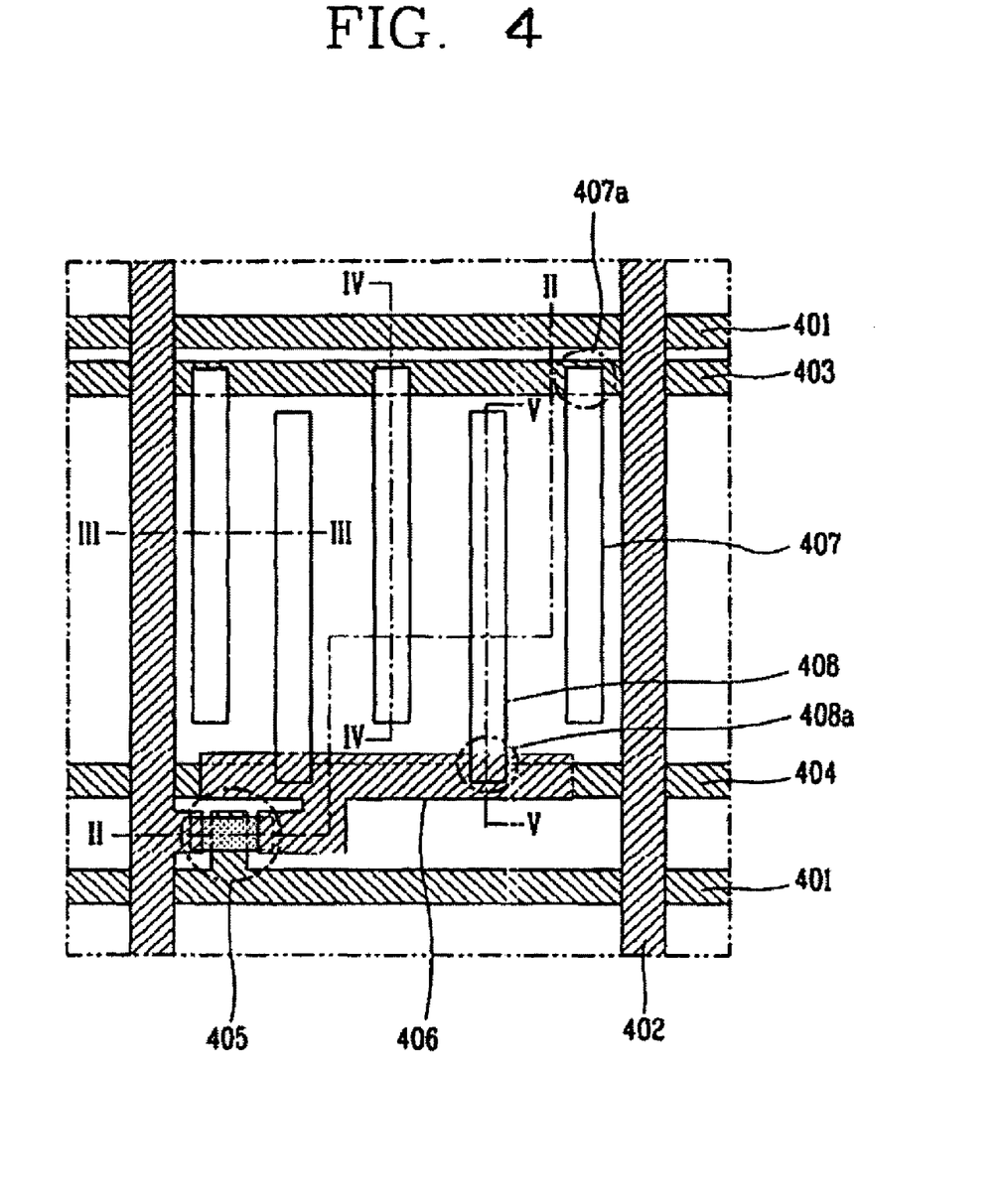
FIG. 4 is a plane view showing a unit pixel of an IPS mode LCD device according to an embodiment of the present invention.

Hereinafter, a unit pixel of an IPS mode LCD device according to a first embodiment of the present invention will be explained with reference to FIG. 4. Referring to FIG. 4, a unit pixel is defined by a plurality of gate lines 401 and a plurality of data lines 402 crossing the gate lines 401.

A thin film transistor 405, which is a switching device, is formed at a corner of the unit pixel. The thin film transistor 405 is formed in a vicinity of each intersection between the gate lines 401 and the data lines 402, and is respectively connected to the gate line 401 and the data line 402. The thin film transistor 405 is connected to the data lines 402 by a source electrode, and a drain electrode 406 corresponding to the source electrode is extended in the unit pixel such that a channel is disposed between the drain electrode and the source electrode. The drain electrode 406 overlaps with a storage line 404 disposed below a gate insulating layer such that a storage capacitor is formed.

In the unit pixel, a common electrode line 403 and the storage line 404 parallel with the gate line 401 are formed. In order to increase an aperture ratio, the common electrode line 403 and the storage line 404 are formed to be adjacent to the gate line 401 as much as possible.

The common electrode line 403 and the storage line 404 are preferred to be formed from the same material as the gate line 401. For example, aluminum alloy or a double layer of Al and Mo may be utilized.

The gate line 401, the common electrode line 403, and the storage line 404 are covered by a gate insulating layer (not shown in FIG. 4) deposited on an entire surface of a substrate. On the gate insulating layer (not shown), the drain electrode 406 of the thin film transistor is formed such that a portion of the drain electrode 406 overlaps with the storage line 404. Accordingly, the drain electrode 406, the storage line 404, and the gate insulating layer disposed therebetween form a storage capacitor. Also on the gate insulating layer, the data line 402 is formed. The drain electrode 406 and the date line 402 are covered by a passivation layer (not shown in FIG. 4).

The unit pixel is provided with at least two concave patterns. The concave patterns include at least one first concave pattern to expose the common electrode line 403 within the unit pixel and at least one second concave pattern to expose the drain electrode 406. The first concave patterns and the second concave patterns correspond to each other by forming each pair. That is, the second concave pattern is formed between the first concave patterns.

The first concave pattern and the second concave pattern are substantially parallel with each other, and are formed by cutting the passivation layer and the gate insulating layer. When the passivation layer is cut, the drain electrode 406 is exposed. Also, when the gate insulating layer is further cut, the common electrode line 403 is exposed.

A transparent electrode material is filled in the first concave pattern and the second concave pattern to form the common electrode 407 connected to the common electrode line 403 and to form the pixel electrode 408 connected to the drain electrode 406. The transparent electrode material is filled only in the first concave pattern and the second concave pattern.

An overcoat layer (not shown in FIG. 4) is formed on the common electrode 407 and the pixel electrode 408 within the first concave pattern and the second concave pattern, thereby protecting the common electrode 407 and the pixel electrode 408. That is, the common electrode 407 and the pixel electrode 408 are formed in the first concave pattern and the second concave pattern respectively, and the overcoat layer is formed on the common electrode 407 and the pixel electrode 408.

The first concave pattern and the second concave pattern expose a portion of the common electrode line 403 and a portion of the drain electrode 406. The common electrode 407 is connected to the common electrode line 403 at a common electrode connecting portion 407a. The pixel electrode 408 is connected to the drain electrode line 406 at a pixel electrode connecting portion 408a.

The pixel electrode 408 receives data signals from the data line 402 through the thin film transistor 405 under the control of the scan signal from the gate line 401. The common electrode 407 receives a common voltage through the common electrode line 403. The data signal on the pixel electrode 408 and the common voltage on the common electrode 407 apply the horizontal electric field to liquid crystal molecules in the unit pixel.

Hereinafter, a structure of the unit pixel of FIG. 4 will be explained in more detail with reference to FIGS. 5A to 5D.

Figure 5A:
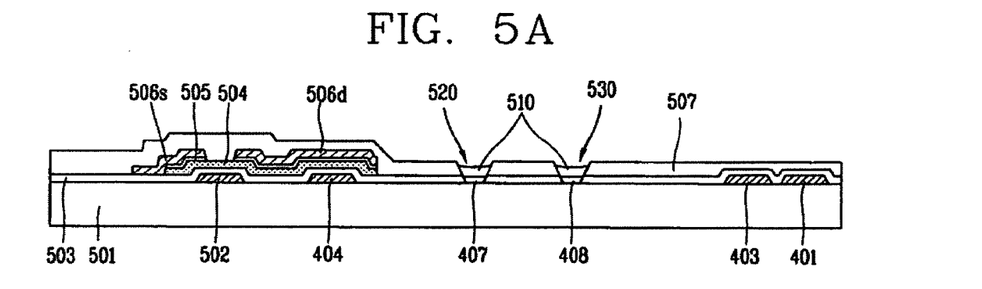
FIG. 5A is a sectional view taken along line II-II in FIG. 4.

FIG. 5A is a sectional view taken along line II-II in FIG. 4. As shown in FIG. 5A, a gate electrode 502, the storage line 404, the common electrode line 403, and the gate line 401 are formed on a substrate 501. The gate electrode 502, the storage line 404, the common electrode line 403, and the gate line 401 are insulated by a gate insulating layer 503. An active layer 504 is formed on the gate insulating layer 503 where the thin film transistor 405 is formed. As shown, the active layer 504 is formed over the gate electrode 502 and over the storage line 404.

At the region where the thin film transistor 405 is formed, source and drain electrodes 506s and 506d are electrically connected to the active layer 504. An ohmic contact layer 505 is disposed between the active layer 504 and the source electrode 506s and disposed between the active layer 504 and the drain electrode 506d.

The drain electrode 506d is extended to overlap with at least a portion of the storage line 404. Accordingly, the storage line 404, the drain electrode 506d, and the gate insulating layer 503 disposed therebetween form the storage capacitor.

A passivation layer 507 is formed on the source/drain electrodes 506s and 506d for protection. The passivation layer 507 and the gate insulating layer 503 inside the unit pixel are partially cut to form the first concave pattern 520 and to form the second concave pattern 530. The concave patterns expose the substrate 501.

The first concave pattern 520 and the second concave pattern 530 are filled with a transparent electrode material forming the common electrode 407 and the pixel electrode 408, respectively. An overcoat layer 510 is formed on the common electrode 407 and on the pixel electrode 408 to protect the common electrode 407 and the pixel electrode 408. The overcoat layer 510 can be formed of a transparent resin or an organic material.

Figure 5B:
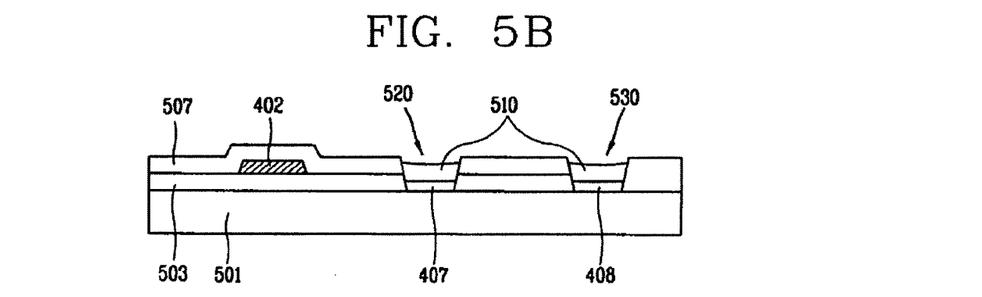
FIG. 5B is a sectional view taken along line III-III in FIG. 4.

FIG. 5B is a sectional view taken along line III-III in FIG. 4. As shown in FIG. 5B, the gate insulating layer 503 is formed on the substrate 501, and the data line 402 is formed thereon. The data line 402 can be of a conductive opaque metal. The passivation layer 507, for example a transparent inorganic layer, may be provided thereon. As noted above, the passivation layer 507 and the gate insulating layer 503 inside the unit pixel are partially cut to form the first concave pattern 520 and the second concave pattern 530.

The common electrode 407 of a transparent electrode material is formed in the first concave pattern 520, and the pixel electrode 408 of a transparent electrode material is formed in the second concave pattern 530. The overcoat layer 510 of a transparent organic layer or a resin is formed on the common electrode 407 and the pixel electrode 408, thereby filling the first concave pattern 520 and the second concave pattern 530.

Figure 5C:
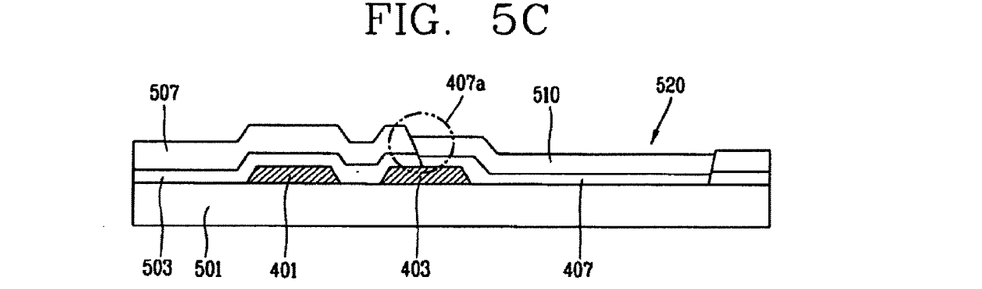
FIG. 5C is a sectional view taken along line IV-IV in FIG. 4.

FIG. 5C is a sectional view taken along line IV-IV in FIG. 4. As shown in FIG. 5C, the gate line 401 and the common electrode line 403 are formed on the substrate 501. The gate line 401 and the common electrode line 403 are covered by the gate insulating layer 503 and the passivation layer 507 formed on the gate insulating layer 503.

The passivation layer 507 and the gate insulating layer 503 within the unit pixel are partially removed, thereby forming the first concave pattern 520. The first concave pattern 520 is formed to be generally parallel with the data line 402 and partially exposes the common electrode line 403 at the common electrode connecting portion 407a (also see FIG. 4). The common electrode 407 is formed in the first concave pattern 520, and is electrically connected to the common electrode line 403. The overcoat layer 510 is formed on the common electrode 407.

Figure 5D:
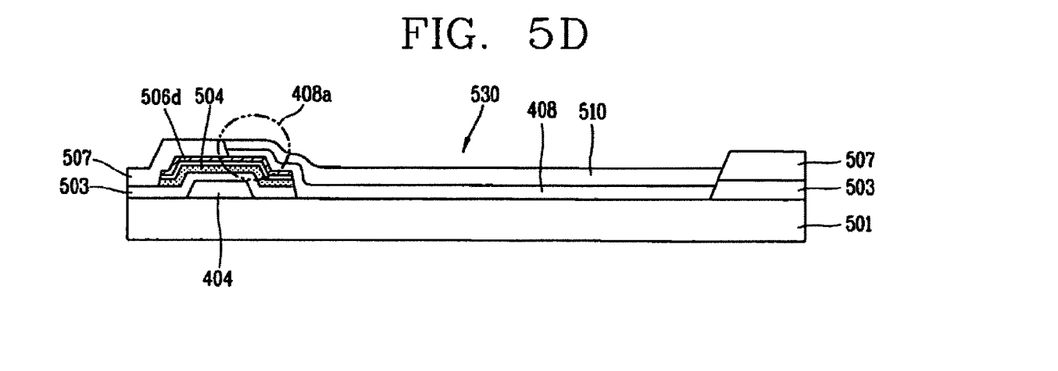
FIG. 5D is a sectional view taken along line V-V in FIG. 4.

FIG. 5D is a sectional view taken along line V-V in FIG. 4. As shown in FIG. 5D, the storage line 404 is formed on the substrate 501. The gate insulating layer 503, the active layer 504, and the drain electrode 506d are sequentially formed on the storage line 404. The passivation layer 507 is formed on the drain electrode 506d.

The passivation layer 507 and the gate insulating layer 503 within the unit pixel are partially removed to form the second concave pattern 530. The second concave pattern 530 is formed to be generally parallel with the data line 402 and partially exposes the drain electrode 506d at the pixel electrode connecting portion 408a (see also FIG. 4). In the second concave pattern 530, the pixel electrode 408 is electrically connected to the drain electrode 506d. The overcoat layer 510 is formed on the pixel electrode 408, thereby filling the second concave pattern 530.

FIGS. 6A to 6G are flowcharts showing a method for fabricating an IPS mode LCD device according to an embodiment of the present invention.

Figure 6A:
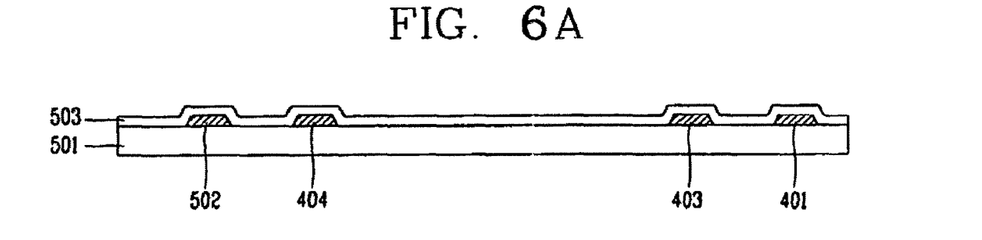
FIGS. 6A to 6G are flowcharts showing a method for fabricating an IPS mode LCD device according to a first embodiment of the present invention.

Referring to FIG. 6A, a conductive metal thin film is deposited on a transparent substrate 501 such as glass by a sputtering method. Then, a photolithograpy process is performed by using a first mask to form the gate line 401, the gate electrode 502, the storage line 404, and the common electrode line 403.

The photolithography process includes depositing a photosensitive film on the metal thin film, exposing the photosensitive film by using the first mask, developing the exposed photosensitive film, etching the metal thin film by using the developed photosensitive pattern, and stripping the photosensitive pattern and washing.

On the gate line 401, the gate electrode 502, the storage line 404, and the common electrode line 403, the gate insulating layer 503 is formed by a plasma chemical vapor deposition method (PECVD). Materials such as silicon nitride SiNx or silicon oxide may be used to form the gate insulating layer 503.

Figure 6B:
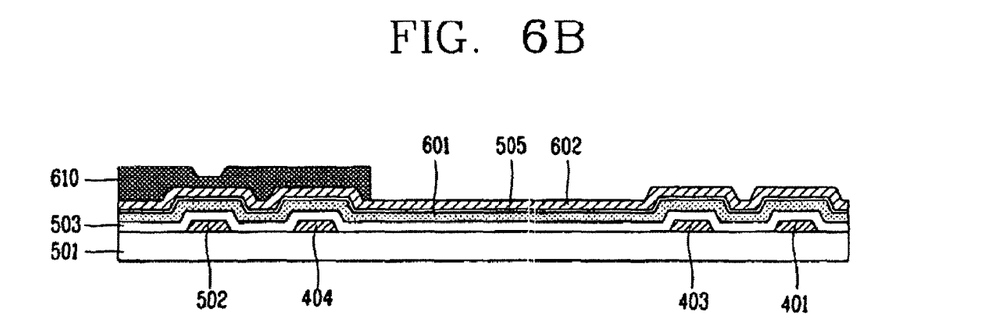

Referring to FIG. 6B, a semiconductor layer 601 and an ohmic contact layer 505 are sequentially deposited on the gate insulating layer 503, for example by utilizing the PECVD method. A conductive layer 602, such as a metal layer, is deposited thereon, for example by utilizing a sputtering method. The semiconductor layer 601 form the active layer 504 and the conductive layer 602 form the source and drain electrodes 506s and 506d.

Next, another photosensitive film is deposited on the conductive layer 602. Then, the photosensitive film is diffraction-exposed by using a diffraction mask (a second mask) to form a photosensitive pattern 610. The photosensitive pattern 610 is constructed such that the photosensitive film above the channel is relatively thin, thereby defining an active region. The photosensitive pattern 610 also defines a drain electrode pattern so that the drain electrode 506d can be formed over the storage line 404.

Figure 6C:
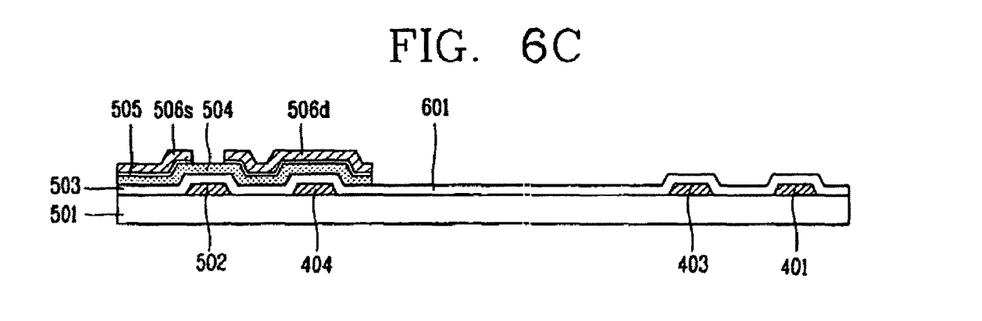

Referring to FIG. 6C, the conductive layer 602, the ohmic contact layer 505, and the semiconductor layer 601 are sequentially etched by using the photosensitive pattern 610 as an etching mask, thereby forming the active layer 504. The conductive layer 602 can be etched by a wet etching, and the ohmic contact layer 505 and the semiconductor layer 601 can be etched by a dry etching.

Then, the photosensitive pattern 610 is ashed, thereby exposing an upper portion of the channel. The photosensitive pattern 610 is diffraction exposed and is constructed such that the upper portion of the channel is relatively thin as noted above. Therefore, if the photosensitive pattern 610 is ashed, the conductive layer 602 on the channel is exposed and the photosensitive pattern 610 defines a source/drain electrode pattern.

The ashed photosensitive pattern 610 is used as an etching mask to further etch the conductive layer 602 and the ohmic contact layer 505 on the channel, thereby forming the source electrode 506s and the drain electrode 506d. As the result, a thin film transistor is formed in the unit pixel, and the storage capacitor formed by the drain electrode 506d and the storage electrode 404 is completed.

Figure 6D:
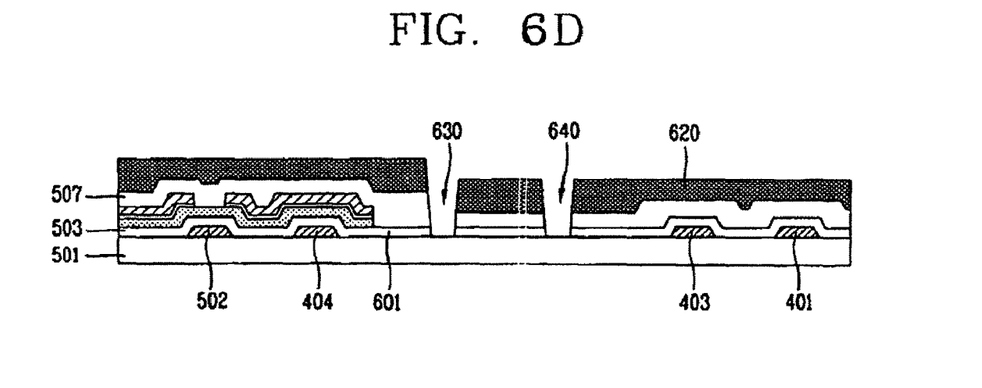

Referring to FIG. 6D, the passivation layer 507, from an inorganic film such as a silicon nitride layer or a silicon oxide layer, is formed on the source/drain electrodes 506s and 506d by the PECVD method.

Next, a photosensitive film is deposited on the passivation layer 507 and then exposed by using a third mask to form a photosensitive pattern 620. The photosensitive pattern 620 defines a common electrode pattern (corresponding to the first concave pattern 520) and a pixel electrode pattern (corresponding to the second concave pattern 530). At least a pair of the common electrode pattern and the pixel electrode pattern are formed in the unit pixel.

Then, the passivation layer 507 and the gate insulating layer 503 within the common electrode pattern and the pixel electrode pattern are etched by using the photosensitive pattern 620 as a mask, thereby exposing the substrate 501. As the result, the first concave pattern 630 (520 in FIGS. 5A-5D) where the common electrode 407 is to be arranged, and the second concave pattern 640 (530 in FIGS. 5A-5D) where the pixel electrode 408 is to be arranged are formed. When the passivation layer 507 is etched, the drain electrode 506d is partially exposed from the second concave pattern 640 in the vicinity of the pixel electrode connecting portion 408a. Also, when the gate insulating layer 503 is further etched, the common electrode line 403 is partially exposed from the first concave pattern 630 in the vicinity of the common electrode connection portion 407a (see also FIGS. 4, 5C and 5D).

Figure 6E:
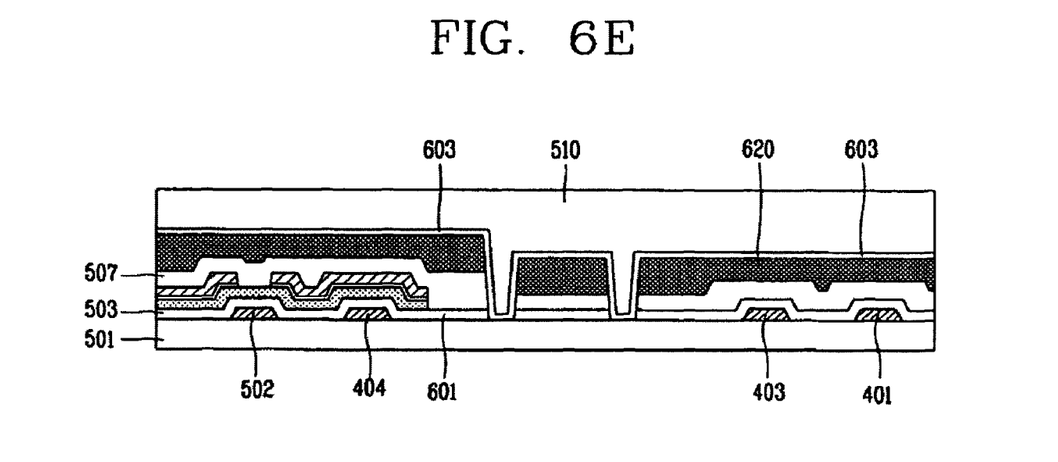

A transparent electrode material 603 is deposited on the photosensitive pattern 620 and in the first concave pattern 630 and in the second concave pattern 640 as shown in FIG. 6E. As a result, the transparent electrode material 603 is deposited on the entire surface of the unit pixel. The transparent electrode material 603 can be an ITO layer or can be formed by a sputtering method.

Then the overcoat layer 510, from a transparent resin or an organic film for example, is deposited on the transparent electrode material 603 to planarize resulting surface entirely. The overcoat layer 510 can be formed of any transparent material that can be hardened by a ultraviolet rays, etc. such as polyurethane acryl rate, poly-carbonate, urethane resin oligomer, etc. The overcoat layer 510 completely fills the inside of the first concave pattern 630 and the second concave pattern 640.

Figure 6F:
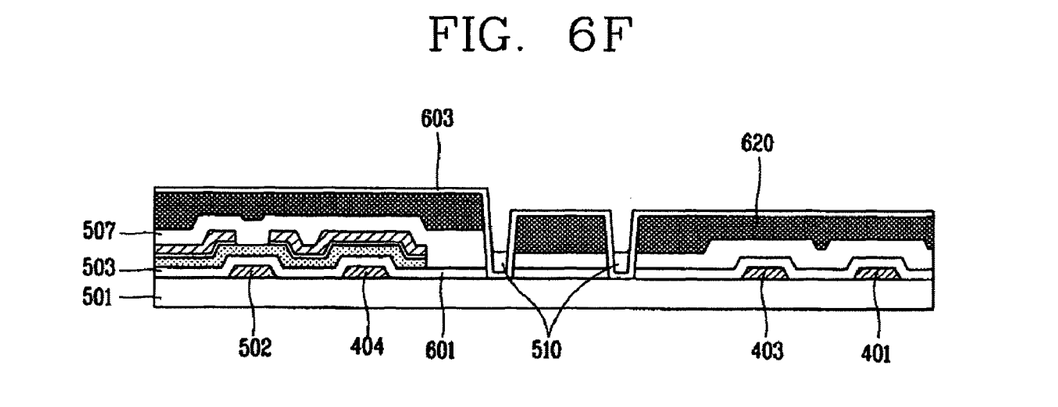

Then, the overcoat layer 510 is sufficiently ashed to be removed so that it remains only in the first concave pattern 630 and the second concave pattern 640. The overcoat layer 510 of the rest of the region is completely removed.

Figure 6G:
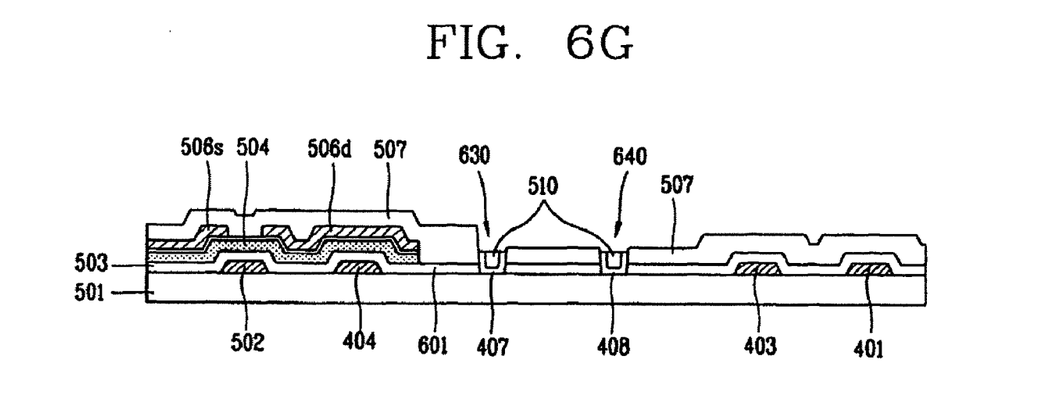

Referring to FIG. 6G, the photoresist pattern 620 and the transparent electrode material 603 formed thereon are removed. The exposed transparent electrode material 603 is removed by an etching process, and then the exposed photoresist pattern 620 is removed by a stripping process.

The transparent electrode material 603 can also be removed by a lift-off process. With the lift-off process, the photoresist pattern 620 and the transparent electrode material 603 formed thereon can be effectively removed at one time. The lift-off process enables the process time for removing the transparent electrode material 603 to be shortened. When a metal layer, etc. is deposited on an organic layer to be ashed, the organic layer and the metal layer thereon can be simultaneously removed by the lift-off process.

After removing the transparent electrode material 603 and the photosensitive pattern 620, the transparent electrode material 603 remains only in the first concave pattern 630 and the second concave pattern 640 thereby to form the common electrode 407 and the pixel electrode 408, respectively. Accordingly, the common electrode 407 and the overcoat layer 510 remain in the first concave pattern 630, and the pixel electrode 408 and the overcoat layer 510 remain in the second concave pattern 640.

A process for etching the transparent electrode material 603 exposed by ashing the overcoat layer and the photosensitive pattern therebelow is explained above with reference to FIGS. 6F and 6G. It should be noted that other methods for omitting the process for removing the photosensitive pattern 620 can be used in the process.

For example, a greater amount of the overcoat layer 510 may remain in the first concave pattern 630 and the second concave pattern 640 than the amount shown in FIG. 6F and the exposed transparent electrode material 603 may be removed. Then, the photosensitive pattern 620, and the overcoat layer 510 inside the first concave pattern 630 and the second concave pattern 640 exposed by removing the transparent electrode material 603 are simultaneously ashed, thereby simultaneously removing the photosensitive pattern 620 and a part of the overcoat layer 510 inside the first concave pattern 630 and a part of the overcoat layer 510 inside the second concave pattern 640. As the result, the overcoat layer 510 remains only in the first concave pattern 630 and in the second concave pattern 640, and the photosensitive pattern 620 is removed.

Then, the overcoat layer 510 formed over the pixel region is hardened by irradiating ultraviolet rays only on the pixel region. The hardening process is performed to remove the overcoat layer 510 formed at a pad portion of an outer periphery of the pixel region. Only the overcoat layer 510 of the pixel region is hardened. The overcoat layer 510 of the pad portion that has not been hardened is removed, thereby exposing the pad portion. Since the ashing characteristic of the overcoat layer 510 becomes different at the time of the hardening process, only the overcoat layer 510 of the pad port-on that has not been hardened is removed.

The step of forming the common electrode 403 and the pixel electrode 408 in the unit pixel can be performed differently from the process as shown in FIGS. 6A-6G.

For example, the step of forming the first concave pattern 630 and the second concave pattern 640 as shown in FIG. 6D may be altered. In the alternate step, the first concave pattern 630 and the second concave pattern 640 are formed, and then the photosensitive pattern 620 is removed. Then, the passivation layer 507 is formed, and the transparent electrode material 603 is formed in the first concave pattern 630 and the second concave pattern 640.

The step of forming the overcoat layer 510 on the transparent electrode material 603, the step of ashing the overcoat layer 510, and the step of etching the transparent electrode material 603 can be performed in the same manner as described above with respect to FIGS. 6A-6G. Accordingly, in this alternate embodiment of the present invention, the first concave pattern 630 and the second concave pattern 640 are formed, and then the photoresist pattern 620 is removed. The overcoat layer 510 is further formed at the pad portion to be exposed, thereby requiring an additional process for removing the overcoat layer 510 of the pad portion.

Hereinafter, a structure of the pad portion will be explained with reference to FIG. 7, and the process for removing the overcoat layer on the pad portion will be explained with reference to FIGS. 8A-8C.

An LCD panel is divided into a pixel region in which unit pixels are arranged in a matrix form, and a pad portion for applying signals to the pixel region. The pad portion includes a gate pad and a data pad which are formed outside the pixel region as gate lines and data lines are extended to the outer periphery of the pixel region.

Figure 7:
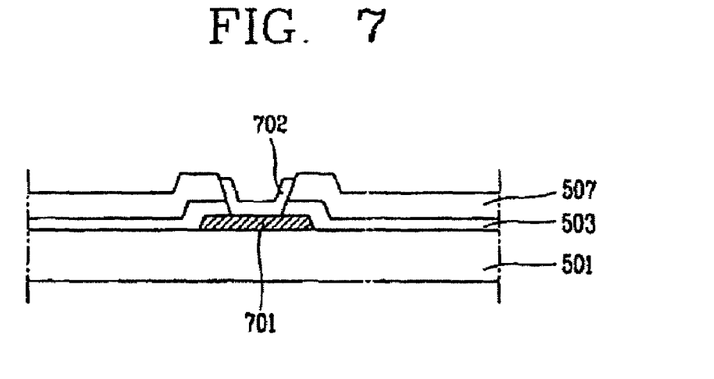
FIG. 7 is a sectional view showing a gate pad of an embodiment of the present invention.

FIG. 7 shows a section of the gate pad portion. Referring to FIG. 7, a lower end portion 701 of the gate pad, which is the end of a gate line, is formed on the substrate 501. The lower end portion 701 of the gate pad is provided with a contact hole formed as the gate insulating layer 503 and the passivation layer 507 are removed. An upper end portion 702 of the gate pad formed from a transparent electrode material is connected to the lower end portion 701 of the gate pad through the contact hole. The lower end portion 701 of the gate pad is simultaneously formed with the gate line. Also, the contact hole for exposing the lower end portion 701 of the gate pad is simultaneously formed with the first concave pattern 630 and the second concave pattern 640 described above. When the transparent electrode material 603 is deposited in the first concave pattern 630 and the second concave pattern 640, the upper end portion 702 of the gate pad is simultaneously formed. When a planarized layer is formed in the first concave pattern and the second concave pattern of the pixel region, the overcoat layer 510 is also formed on the upper end portion 702 of the gate pad. Therefore, it is necessary to remove the overcoat layer 510 formed on the upper end portion 702 of the gate pad.

Hereinafter, a process for hardening the overcoat layer will be explained in more detail with reference to FIGS. 8A to 8C.

Figure 8A:
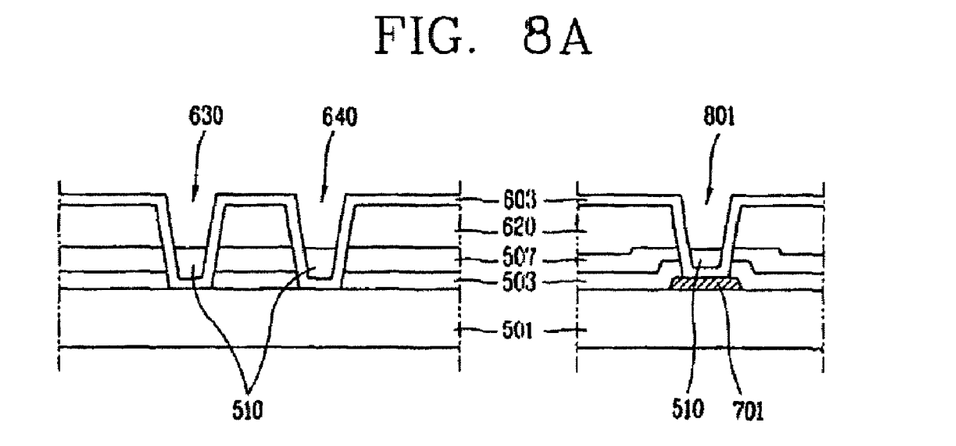
FIGS. 8A to 8C are flowcharts showing a method for fabricating a gate pad according to an embodiment of the present invention.

FIG. 8A shows the first concave pattern 630 and the second concave pattern 640 within a unit pixel, and a gate pad of a pad portion. The overcoat layer 510 ashed thereby to remain only in the first concave pattern 630 and the second concave pattern 640, and a transparent electrode material 603 is formed on a photoresist pattern 620 (see also FIG. 6F). The transparent electrode material 603 is formed in a contact hole 801 of the gate pad, and the overcoat layer 510 is formed thereon.

Figure 8B:
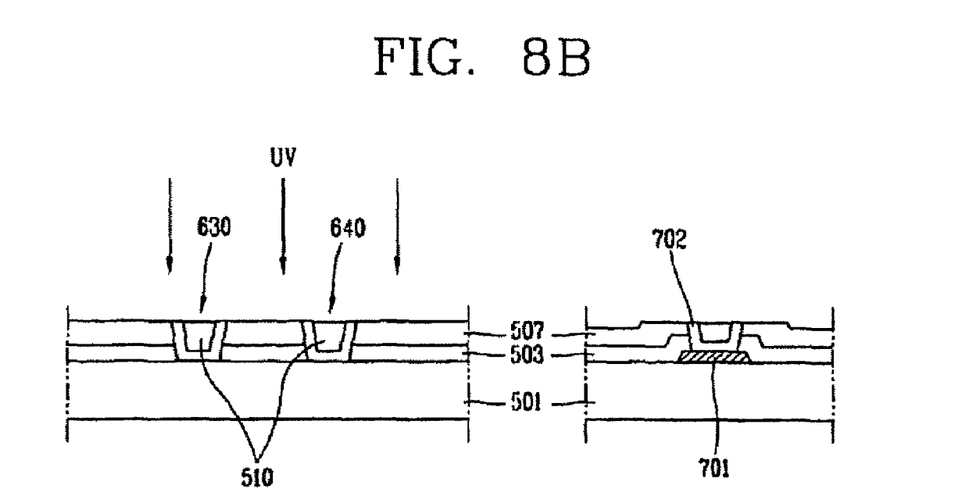
Figure 8C:
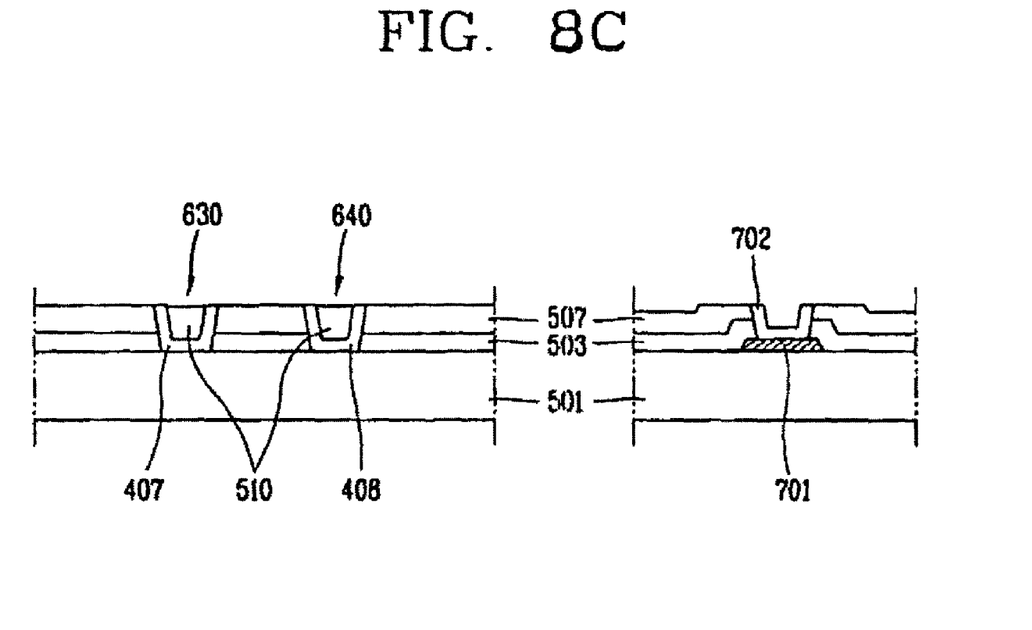

Referring to FIG. 8B, the exposed transparent electrode material 603 and the photoresist pattern 620 therebelow are sequentially removed. When the transparent electrode material 603 and the photoresist pattern 620 on the gate pad are removed, the upper end portion 702 of the gate pad is formed. In the first and second concave patterns 630, 640 of the pixel region and in the contact hole 801 of the pad region, the overcoat layer 510 still remains over the common electrode 407, the pixel electrode 408 and the upper end portion 702.

The pixel region where the first concave pattern 630 and the second concave patter 640 are formed is selectively opened, the region where the gate pad is to be formed is selectively covered, and then ultraviolet rays is irradiated on the pixel region thereby to harden the overcoat layer 510. Then, the overcoat layer 510 of the gate pad portion that has not been hardened is selectively removed. As the result, as shown in FIG. 8C, a gate pad exposed to outside is formed.

The IPS mode LCD device according to the embodiment of the present invention can be fabricated by using only three masks, which greatly reduces the number of fabrication processing steps.

In the embodiment of the present invention, a method for fabricating an IPS mode LCD device by using three masks including a diffraction mask and by applying an amorphous silicon as a channel layer of a thin film transistor is explained. However, the present invention can be also applied to the conventional method for fabricating an IPS mode LCD device by using five masks. That is, in an embodiment of the present invention, a passivation layer is formed, and then a common electrode and a pixel electrode are formed by using one mask. Therefore, the present invention can be applied to various processes for forming a thin film transistor prior to forming a passivation layer, thereby reducing the number of fabrication processes.

Especially, the present invention can be applied to the conventional LCD fabrication method using five masks and applying an amorphous silicon as a channel layer, and can be applied to a method for fabricating a poly-silicon LCD device in which a poly-silicon is used as a channel layer. Accordingly, the entire fabrication process can be simplified.

As aforementioned, in the embodiment of the present invention, the number of masks is decreased in fabricating an IPS mode LCD device. Accordingly, the entire fabrication process is simplified, which reduces the fabrication cost and increases productivity. Furthermore, the number of masks is reduced which further decreases the fabrication cost.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for fabricating an in plane switching (IPS) mode liquid crystal display (LCD) device, comprising:
    forming a gate line, a gate electrode, a common electrode line, and a storage line over a substrate;
    forming a gate insulating layer on the gate line, the gate electrode, the common electrode line, and the storage line;
    forming a semiconductor layer, an ohmic contact layer, and a conductive layer over the gate insulating layer;
    forming source and drain electrodes and an active layer therebetween by etching the semiconductor layer, the ohmic contact layer and the conductive layer;
    forming a passivation layer over the source and drain electrodes;
    forming a photosensitive pattern over the passivation layer;
    etching the passivation layer and the gate insulating layer using the photosensitive pattern as a mask to form a first concave pattern exposing the common electrode line and a second concave pattern exposing the drain electrode; and
    forming a common electrode in the first concave pattern to electrically connect with the common electrode line and forming a pixel electrode in the second concave pattern to electrically connect with the drain electrode.

2. The method of claim 1, wherein the step of forming the common electrode in the first concave pattern and the pixel electrode in the second concave pattern, comprises:
    forming a transparent electrode material over the photosensitive pattern, the first concave pattern, and the second concave pattern;

forming an overcoat layer on the transparent electrode material;
removing the overcoat layer so that the overcoat layer remains only in the first concave pattern and the second concave pattern;
removing the transparent electrode material exposed from removing the overcoat layer; and
hardening the overcoat layer remaining in the first concave pattern and the second concave pattern.

3. The method of claim 1, wherein the step of forming the active layer and the source and drain electrodes, comprises:
forming a photosensitive layer over the conductive layer;
diffraction-exposing the photosensitive layer by using a diffraction mask to create a diffraction-exposed photosensitive pattern;
etching the conductive layer, the ohmic contact layer, and the semiconductor layer by using the diffraction-exposed photosensitive pattern;
ashing the diffraction-exposed photosensitive pattern to expose the conductive layer above the semiconductor layer serving as a channel layer;
removing the conductive layer and the ohmic contact layer by using the ashed photosensitive pattern as a mask to expose the channel layer.

4. The method of claim 2, wherein in the step of removing the transparent electrode material comprises simultaneously removing the photosensitive pattern and the transparent electrode material formed thereon by a lift-off method.

5. The method of claim 2, wherein in the step of hardening the overcoat layer comprises hardening only the overcoat layer within a pixel region.

6. The method of claim 5, further comprising removing the overcoat layer outside the pixel region to expose a pad portion.

7. The method of claim 1, wherein the step of forming the source and drain electrodes comprises overlapping the drain electrode with the storage line.

8. The method of claim 1, wherein the step of forming the common electrode in the first concave pattern and forming the pixel electrode in the second concave pattern comprises:
exposing the passivation layer by removing the photosensitive pattern;
forming a transparent electrode material over the passivation layer and in the first concave pattern and the second concave pattern;
forming an overcoat layer on the transparent electrode material;
removing the overcoat layer so that the overcoat layer remains only in the first concave pattern and the second concave pattern;
removing the transparent electrode material exposed from removing the overcoat layer; and
hardening the overcoat layer remaining in the first concave pattern and the second concave pattern.

9. The method of claim 1, wherein the step of forming the common electrode in the first concave pattern and forming the pixel electrode in the second concave pattern comprises:
removing the photosensitive pattern;
forming a transparent electrode material over the passivation layer and in the first concave pattern and the second concave pattern;
forming an overcoat layer over the transparent electrode material;
removing the overcoat layer so that the overcoat layer remains only in the first concave pattern and the second concave pattern;
removing the transparent electrode material; and
hardening the overcoat layer remaining in the first concave pattern and the second concave pattern.

10. A method to form an in-plane switching LCD device, comprising:
forming a storage line to be disposed in a unit pixel of the LCD device;
forming a common electrode and a pixel electrode disposed in the unit pixel such that the common and pixel electrodes apply a horizontal electric field in conjunction with each other; and
forming a switching device to be disposed in the unit pixel including a drain electrode of the switching device to overlap the storage line in the unit pixel to form a storage capacitor.

11. The method of claim 10, wherein the step of forming the common and pixel electrodes comprises:
forming a first concave area over the substrate in a first area of the unit pixel;
forming a second concave area over the substrate in a second area of the unit pixel;
forming the common electrode in the first concave area; and
forming the pixel electrode in the second concave area.

12. The method of claim 11, further comprising forming an overcoat layer to be disposed over the common electrode in the first concave area and over the pixel electrode in the second concave area.

13. A method to form an in-plane switching LCD device, comprising:
forming a common electrode to be disposed in a first concave pattern in the unit pixel, wherein the first concave pattern is formed to expose a portion of a common electrode line such that the common electrode branches from and electrically connects with the common electrode line; and
forming a pixel electrode to be disposed in a second concave pattern in the unit pixel, wherein the second concave pattern is formed to expose a portion of a drain electrode of a switching device such that the pixel electrode electrically connects with the drain electrode, wherein the common and pixel electrodes apply a horizontal electric field in conjunction with each other.

14. The method of claim 13, further comprising:
forming a storage line disposed in the unit pixel; and
extending a portion of the drain electrode of the switching device to overlap the storage line to form a storage capacitor.

* * * * *